United States Patent
Kuchciak et al.

(10) Patent No.: US 12,244,870 B2
(45) Date of Patent: Mar. 4, 2025

(54) DYNAMIC QUEUING OF ENTROPY-CODED DATA FOR TRANSMISSION IN A BITSTREAM

(71) Applicant: Synaptics Incorporated, San Jose, CA (US)

(72) Inventors: Kamil Sławomir Kuchciak, Jastrzębie-Zdrój (PL); Paweł Krzysztof Szyszko, Tychy (PL)

(73) Assignee: Synaptics Incorporated, San Jose, CA (US)

( * ) Notice: Subject to any disclaimer, the term of this patent is extended or adjusted under 35 U.S.C. 154(b) by 146 days.

(21) Appl. No.: 18/049,777

(22) Filed: Oct. 26, 2022

(65) Prior Publication Data
US 2024/0146975 A1 May 2, 2024

(51) Int. Cl.
*H04N 19/13* (2014.01)
*H04N 19/70* (2014.01)
*H04N 19/91* (2014.01)

(52) U.S. Cl.
CPC ............ *H04N 19/91* (2014.11); *H04N 19/13* (2014.11); *H04N 19/70* (2014.11)

(58) Field of Classification Search
CPC ......... H04N 19/91; H04N 19/13; H04N 19/70
USPC ..................................... 375/240.02
See application file for complete search history.

(56) References Cited

U.S. PATENT DOCUMENTS

2003/0228063 A1* 12/2003 Nakayama ........... H04N 19/152
  375/E7.139
2006/0209952 A1* 9/2006 Tanizawa ............. H04N 19/192
  375/E7.199

OTHER PUBLICATIONS

Search Report, dated Apr. 26, 2024, from UK Patent Application No. GB2316228.2, pp. 1-4.
Battista et al., "Overview of the Low Complexity Enhancement Video Coding (LCEVC) Standard," IEEE Transactions on Circuits and Systems for Video Technology, vol. 32, No. 11, pp. 7983-7995, Nov. 2022.

* cited by examiner

*Primary Examiner* — Jeffery A Williams
(74) *Attorney, Agent, or Firm* — Paradice & Li LLP

(57) ABSTRACT

This disclosure provides methods, devices, and systems for data compression. The present implementations more specifically relate to dynamically queuing entropy-coded data to be transmitted in a bitstream. For example, an encoder may perform a first order image compression operation on raw image data to produce a set of first order coefficients and may perform a second order image compression operation on at least a subset of the first order coefficients to produce a set of second order coefficients. The encoder may further encode the first and second order coefficients as first and second order codewords, respectively, according to an entropy coding scheme. In some aspects, the encoder may output the first order codewords to a transmit queue before the lengths of the second order codewords are known. However, in some implementations, the second order codewords may be transmitted from the transmit queue before the first order codewords.

17 Claims, 6 Drawing Sheets

DYNAMIC QUEUING OF ENTROPY-CODED DATA FOR TRANSMISSION IN A BITSTREAM

TECHNICAL FIELD

The present implementations relate generally to data compression, and specifically to dynamic queuing of entropy-coded data for transmission in a bitstream.

BACKGROUND OF RELATED ART

Data compression is a technique for encoding information into (generally) smaller units of data. As such, data compression can be used to reduce the bandwidth or overhead needed to store or transmit such information over a communications channel (such as a wired or wireless medium). For example, an encoder encodes or compresses the information into a sequence of coded bits (also referred to as a "codeword") and a decoder subsequently decodes or decompresses the codeword to recover the original information. Data compression techniques can be generally categorized as "lossy" or "lossless." Lossy data compression may result in some loss of information between the encoding and decoding of such information. In contrast, no information is lost as a result of encoding or decoding such information using lossless data compression.

Entropy coding is a form of lossless data compression that encodes data values (or "symbols") into codewords of varying lengths based on the probability of occurrence of each symbol. For example, data symbols that have a higher probability of occurrence may be encoded into shorter codewords than data symbols that have a lower probability of occurrence. Codewords output by an encoder are often stored or buffered in a transmit queue to be transmitted, as a bitstream, to a decoder. Because entropy coding produces codewords of varying lengths, the location of each codeword in the bitstream depends on the lengths of any preceding codewords. Accordingly, many encoders that implement entropy coding techniques are configured to produce or otherwise output codewords to the transmit queue according to the order in which they are transmitted in the bitstream.

Some codewords may be encoded earlier but transmitted later in the bitstream than other codewords. Delaying the output (to a transmit queue) of any codewords that are already encoded may result in an inefficient use of encoder resources. Thus, new encoding processes may be needed to improve the efficiency or reduce the complexity of entropy coding by an encoder.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of data encoding that can be performed by an encoder. The method includes steps of performing a first order image compression operation that produces a plurality of first coefficients based on pixel data associated with an image; performing a second order image compression operation that produces one or more second coefficients based on the plurality of first coefficients; encoding the plurality of first coefficients as a plurality of first codewords, respectively, in accordance with an entropy coding scheme; encoding the one or more second coefficients as one or more second codewords, respectively, in accordance with the entropy coding scheme; and outputting the plurality of first codewords, followed by the one or more second codewords, to a transmit queue that stores data for transmission in a bitstream. In some implementations, the second order image compression operation may be performed after outputting the plurality of first codewords to the transmit queue.

Another innovative aspect of the subject matter of this disclosure can be implemented in an encoder that includes a processing system and a memory. The memory stores instructions that, when executed by the processing system, cause the encoder to perform a first order image compression operation that produces a plurality of first coefficients based on pixel data associated with an image; perform a second order image compression operation that produces one or more second coefficients based on the plurality of first coefficients; encode the plurality of first coefficients as a plurality of first codewords, respectively, in accordance with an entropy coding scheme; encode the one or more second coefficients as one or more second codewords, respectively, in accordance with the entropy coding scheme; and output the plurality of first codewords, followed by the one or more second codewords, to a transmit queue that stores data for transmission in a bitstream. In some implementations, the second order image compression operation may be performed after outputting the plurality of first codewords to the transmit queue.

Another innovative aspect of the subject matter of this disclosure can be implemented in a system that includes an encoder, a transmit queue, and a post-processor. The encoder is configured to perform a first order image compression operation that produces a plurality of first coefficients based on pixel data associated with an image; perform a second order image compression operation that produces one or more second coefficients based on the plurality of first coefficients; encode the plurality of first coefficients as a plurality of first codewords, respectively, in accordance with an entropy coding scheme; encode the one or more second coefficients as one or more second codewords, respectively, in accordance with the entropy coding scheme; output the plurality of first codewords followed by the one or more second codewords. In some implementations, the encoder may perform the second order image compression operation after outputting the plurality of first codewords to the transmit queue. The transmit queue is configured to store the plurality of first codewords and the one or more second codewords output by the encoder. The post-processor is configured to transmit the plurality of first codewords and the one or more second codewords from the transmit queue to a decoder.

BRIEF DESCRIPTION OF THE DRAWINGS

The present implementations are illustrated by way of example and are not intended to be limited by the figures of the accompanying drawings.

DETAILED DESCRIPTION

Figure 1:
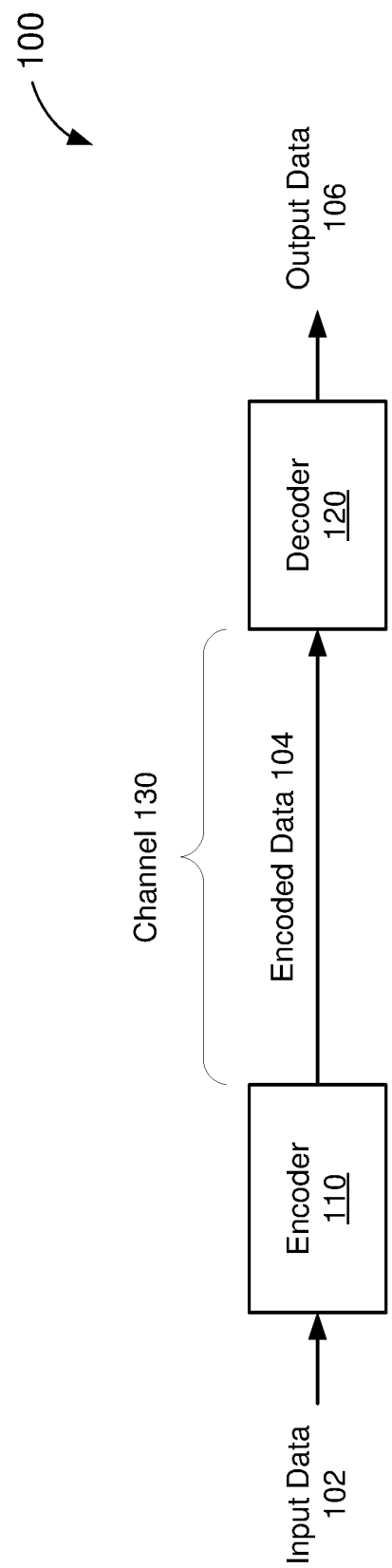
FIG. 1 shows an example communication system for encoding and decoding data.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, entropy coding is a form of lossless data compression that encodes data values (or "symbols") into codewords of varying lengths based on the probability of occurrence of each symbol. Codewords output by an encoder are often stored or buffered in a transmit queue to be transmitted, as a bitstream, to a decoder. Because entropy coding produces codewords of varying lengths, the location of each codeword in the bitstream depends on the lengths of any preceding codewords. Accordingly, many encoders that implement entropy coding techniques are configured to produce or otherwise output codewords to the transmit queue according to the order in which they are transmitted in the bitstream. However, some codewords may be encoded earlier but transmitted later in the bitstream than other codewords.

For example, some image compression operations can be performed on raw image data to produce a set of symbols or coefficients (also referred to as "first order coefficients") that provide a relatively fine or detailed representation of an image while some other image compression operations can be performed on at least a subset of the first order coefficients to produce a set of symbols or coefficients (also referred to as "second order coefficients") that provide a coarser representation of the image. The first and second order coefficients are entropy coded as first and second order codewords, respectively, and output to a transmit queue. Because they can be used to reproduce the digital image faster (with coarser granularity), second order codewords are often transmitted to a decoder before the associated first order codewords. As a result, the decoder may choose to decode only the second order coefficients depending on bandwidth or latency constraints.

Because second order coefficients are coded representations of first order coefficients, the encoder must produce the first order coefficients before it can produce the second order coefficients. However, because the second order codewords are often transmitted to a decoder before the first order codewords, many existing encoders retain the first order coefficients (or the first order codewords) in their internal registers until the lengths of the second order codewords are known. Aspects of the present disclosure recognize that the efficiency of the encoder can be improved by entropy coding the first order coefficients as the first order codewords and outputting the first order codewords to the transmit queue without waiting until the lengths of the second order codewords are known.

Various aspects relate generally to data compression, and more particularly, to techniques for dynamically queuing entropy-coded data to be transmitted in a bitstream. For example, an encoder may perform a first order image compression operation on raw image data to produce a set of first order coefficients and may perform a second order image compression operation on at least a subset of the first order coefficients to produce a set of second order coefficients. The encoder may further encode the first and second order coefficients as first and second order codewords, respectively, according to an entropy coding scheme. In some aspects, the encoder may output the first order codewords to a transmit queue before the lengths of the second order codewords are known. In some implementations, the encoder may output the first order codewords to the transmit queue before performing the second order image compression operation on the first order coefficients. The transmit queue may store data to be transmitted, as a bitstream, to a decoder. In some implementations, the second order codewords may be transmitted from the transmit queue before the first order codewords (in the bitstream).

Particular implementations of the subject matter described in this disclosure can be implemented to realize one or more of the following potential advantages. By outputting first order codewords to a transmit queue before the lengths of the second order codewords are known, aspects of the present disclosure may improve the efficiency of encoders implementing entropy coding techniques. For example, an encoder may remove the first order coefficients (or the first order codewords) from its internal registers sooner, which allows the encoder to receive and process new image data more frequently. As a result, the encoder may encode a greater number of images (or portions thereof) in parallel or otherwise increase the parallelization of various encoding operations (such as image compression or entropy coding). For example, the encoder may perform the second order image compression operation on a first image tile while concurrently performing the first order image compression operation on a second image tile, where the first and second image tiles represent different portions of a digital image.

FIG. 1 shows an example communication system 100 for encoding and decoding data. The communication system 100 includes an encoder 110 and a decoder 120. The encoder 110 and the decoder 120 may be provided in respective communication devices such as, for example, computers, switches, routers, hubs, gateways, cameras, displays, or other devices capable of transmitting or receiving communication signals.

The encoder 110 receives input data 102 to be transmitted or stored via a channel 130. For example, the channel 130 may include a wired or wireless transmission medium that facilities communications between the encoder 110 and the decoder 120. Alternatively, or in addition, the channel 130 may include a data storage medium. In some aspects, the encoder 110 may be configured to compress the size of the input data 102 to accommodate the bandwidth, storage, or other resource limitations associated with the channel 130. For example, the encoder 110 may encode each unit of input data 102 as a respective "codeword" that can be transmitted or stored over the channel 130 (as encoded data 104). The decoder 120 is configured to receive the encoded data 104 via the channel 130 and decode the encoded data 104 as output data 106. For example, the decoder 120 may decompress or otherwise reverse the compression performed by the encoder 110 so that the output data 106 is substantially similar, if not identical, to the original input data 102.

Data compression techniques can be generally categorized as "lossy" or "lossless." Lossy data compression may result in some loss of information between the encoding and decoding steps. As such, the output data 106 may be different than the input data 102. In contrast, lossless data compression does not result in any loss of information between the encoding and decoding steps as long as the channel 130 does not introduce errors into the encoded data 104. As a result of lossless compression, the output data 106 is identical to the input data 102. Entropy encoding is a form of lossless data compression that encodes data values (or "symbols") into codewords of varying lengths based on the probability of occurrence of each data symbol. For example, data symbols that have a higher probability of occurrence may be encoded into shorter codewords than data symbols that have a lower probability of occurrence. Example entropy encoding techniques include, among other examples, arithmetic coding, Huffman coding, and Golomb coding.

Figure 2:
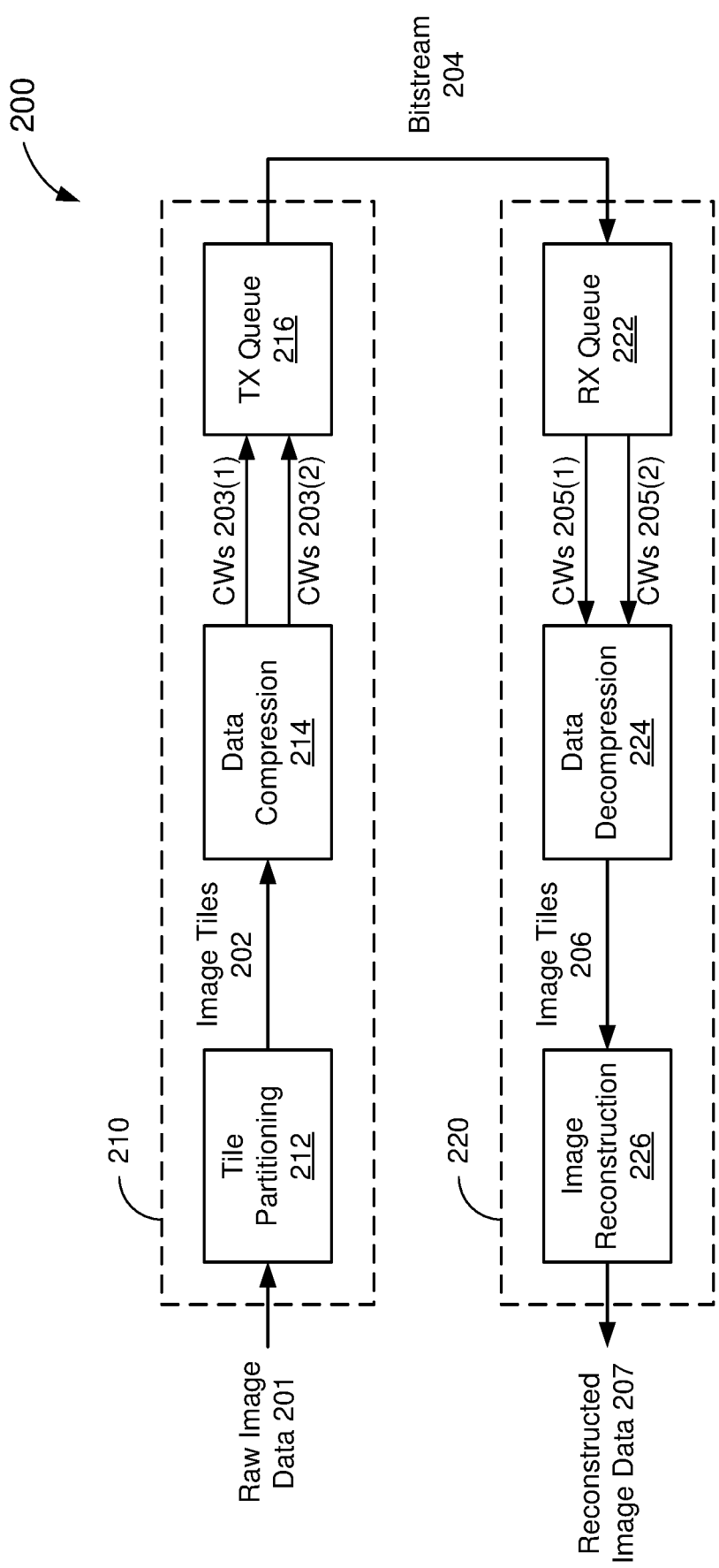
FIG. 2 shows a block diagram of an example image transmission system, according to some implementations.

FIG. 2 shows a block diagram of an example image transmission system 200, according to some implementations. The system 200 includes an image encoder 210 and an image decoder 220. In some implementations, the image encoder 210 and the image decoder 220 may be examples of the encoder 110 and decoder 120, respectively, of FIG. 1. Thus, the image encoder 210 may be communicatively coupled to the image decoder 220 via a channel (such as the channel 130 of FIG. 1).

The image encoder 210 is configured to encode raw image data 201 for transmission, as a coded bitstream 204, to the image decoder 220. For example, a frame of raw image data 201 may include an array of pixel values (or multiple arrays of pixel values associated with different color channels) representing a digital image or frame of video captured or acquired by an image source (such as a camera or other image output device). In some aspects, the image encoder 210 may receive a sequence of frames of raw image data 201 each representing a respective image or frame of a digital video.

The image decoder 220 is configured to decode the bitstream 204 to recover reconstructed image data 207 for display on a display device (such as a television, computer monitor, smartphone, or any other device that includes an electronic display). More specifically, the image decoder 220 may reverse the encoding performed by the image encoder 210 so that the reconstructed image data 207 is substantially similar, if not identical, to the raw image data 201. In some aspects, the image decoder 220 may display or render a sequence of frames of reconstructed image data 207, as a digital video, on the display device.

In some implementations, the image encoder 210 may include a tile partitioning component 212, a data compression component 214, and a transmit (TX) queue 216. The tile partitioning component 212 partitions or subdivides each frame of raw image data 201 into a number of image tiles 202. Each image tile 202 includes a subset of pixel values, from the frame of raw image data 201, representing a respective portion or region of the digital image. As used herein, the term "co-located image tiles" refers to image tiles that map to, or are otherwise associated with, the same relative location (such as the top-left corner of an image) in different images or frames of video.

The data compression component 214 is configured to compress the image tiles 202 to reduce the size of data transmissions from the image encoder 210 to the image decoder 220. In some aspects, the data compression component 214 may be configured to encode the image tiles 202 at multiple levels of granularity. For example, the data compression component 214 may perform a first order image compression operation on the raw image data 201 associated with each image tile 202 to produce a set of first order coefficients that can be used to reproduce the image tile 202 with a high degree of detail or accuracy. Example suitable first order image compression operations may include differential encoding, spatial-frequency transformation, and quantization, among other examples.

The data compression component 214 may further perform a second order image compression operation on at least a subset of the first order coefficients to produce a set of second order coefficients that can be used to reproduce the image tile 202 with coarser granularity. Example second order image compression operations may include summing, subtracting, or averaging two or more first order coefficients. In some implementations, the second order coefficients may be decoded in addition to, or in lieu of, the first order coefficients. For example, a decoder may use the second order coefficients to check for errors among the first order coefficients. Alternatively, a decoder may reconstruct the image tile 202 (such as at a lower resolution) using only the second order coefficients.

In some implementations, the data compression component 214 may further encode each of the first and second order coefficients according to an entropy coding scheme. More specifically, the data compression component 214 may encode each of the first order coefficients as a respective first order codeword (CW) 203(1) and may encode each of the second order coefficients as a respective second order codeword 203(2). The TX queue 216 stores or buffers the codewords 203(1) and 203(2) for transmission, as a bitstream 204, to the image decoder 220. In some implementations, the image decoder 220 may selectively decode only the second order codewords (and discard the first order codewords) based on bandwidth limitations or latency requirements. As such, the second order codewords 203(2) associated with each image tile may precede the first order codewords 203(1) associated with the image tile in the bitstream 204 (and in the TX queue 216).

In some aspects, the data compression component 214 may output the first order codewords 203(1) to the TX queue 216 without knowing the lengths of the second order codewords 203(2) that precede the first order codewords 203(1) in the TX queue 216. In other words, the TX queue 216 may be configured to store the first order codewords 203(1) associated with each image tile prior to storing the second order codewords 203(2) associated with the image tile. In some implementations, the first order codewords 203(1) may be stored in a portion of the TX queue 216 reserved for first order codewords and the second order codewords 203(2) may be stored in a portion of the TX queue 216 reserved for second order codewords. This allows the first order codewords 203(1) associated with a given image tile to be output earlier by the data compression component 214 than the second order codewords 203(2) associated with the image tile but transmitted later from the transmit queue 216.

In some implementations, the image decoder 220 may include a receive (RX) queue 222, a data decompression component 224, and an image reconstruction component 226. The RX queue 222 stores or buffers the bitstream 204 to produce a set of reconstructed first order codewords 205(1) and a set of reconstructed second order codewords 205(2) associated with each image tile of a given image or video frame. More specifically, the RX queue 222 may reconstruct the first order codewords 203(1) and the second order codewords 203(2) transmitted by the image encoder 210. Thus, the codewords 205(1) and 205(2) may represent the codewords 203(1) and 203(2), respectively, as received over a channel by the image decoder 220.

The data decompression component 224 is configured to decompress the codewords 205(1) or 205(2) to recover a set of reconstructed image tiles 206 representing a digital image or video frame. More specifically, the data decompression component 224 may reverse the compression performed by the data compression component 214. For example, the data decompression component 224 may decode the reconstructed first order codewords 205(1) and the reconstructed second order codewords 205(2) to recover first order coefficients and second order coefficients, respectively, according to the entropy coding scheme implemented by the data compression component 214. In some implementations, the data decompression component 224 may decode only the reconstructed second order codewords 205(2) when bandwidth is limited, or when low latency frame updates are required.

The image reconstruction component 226 aggregates the reconstructed image tiles 206 as reconstructed image data 207. More specifically, the image reconstruction component 226 may reverse the partitioning performed by the tile partitioning component 212, for example, by reassembling the reconstructed image tiles 206 into a frame of reconstructed image data 207 that resembles the frame of raw image data 201 encoded by the video encoder 210. The reconstructed image data 207 can further be displayed or otherwise rendered as a digital image on an electronic display.

Figure 3:
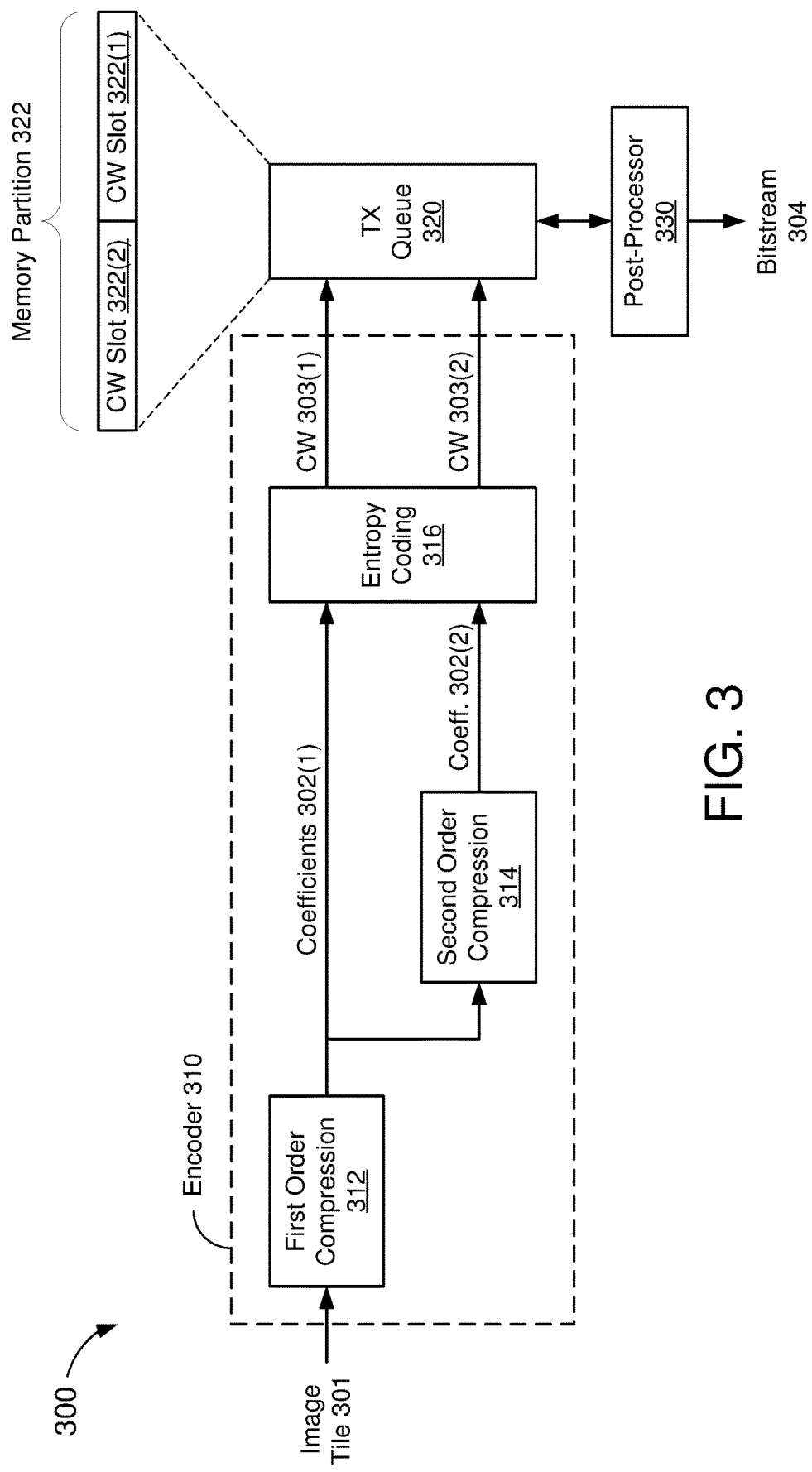
FIG. 3 shows a block diagram of an example image encoding system, according to some implementations.

FIG. 3 shows a block diagram of an example image encoding system 300, according to some implementations. In some implementations, the image encoding system 300 may be one example of the image encoder 210 of FIG. 2. More specifically, the image encoding system 300 may encode an image tile 301 as a set of first order codewords 303(1) and a set of second order codewords 303(2) to be transmitted in a bitstream 304. With reference for example to FIG. 2, the image tile 301 may be one example of any of the image tiles 202, each first order codeword 303(1) may be one example of any of the first order codewords 203(1), each second order codeword 303(2) may be one example of any of the second order codewords 203(2), and the bitstream 304 may be one example of the bitstream 204.

The image encoding system 300 includes an encoder 310, a TX queue 320, and a post-processor 330. The encoder 310 is configured to encode the image tile 301 as the first order codewords 303(1) and the second order codewords 303(2). In some aspects, the encoder 310 may include a first order compression component 312, a second order compression component 314, and an entropy coding component 316. In some implementations, the encoder 310 may include additional higher order compression components (not shown for simplicity). The first order compression component 312 is configured to perform a first order image compression operation that produces a set of first order coefficients 302(1) based on the image tile 301. Example suitable first order image compression operations may include differential encoding, spatial-frequency transformation, and quantization, among other examples. The first order coefficients 302(1) are further provided as inputs to the second order image compression component 314 and the entropy coding component 316.

The second order compression component 314 is configured to perform a second order image compression operation that produces a set of second order coefficients 302(2) based on a subset of the first order coefficients 302(1) (which may include some or all of the first order coefficients 302(1) produced by the first order compression component 312). Example suitable second order image compression operations may include summing, subtracting, or averaging two or more of the first order coefficients 302(1). The entropy coding component 316 is configured to encode the subset of first order coefficients 302(1) and the set of second order coefficients 302(2) as first order codewords (CW) 303(1) and second order codewords 303(2), respectively, according to an entropy coding scheme. In some implementations, the entropy coding component 316 may be configured to receive or process the first order coefficients 302(1) earlier than the second order compression component 314. As such, the encoder 310 may produce (and output) the first order codewords 303(1) before producing the second order coefficients 302(2).

The TX queue 320 is configured to store the codewords 303(1) and 303(2) output by the encoder 310. More specifically, the TX queue 320 may buffer the codewords 303(1) and 303(2) for transmission in the bitstream 304. In some implementations, the second order codewords 303(2) may precede the first order codewords 303(1) in the bitstream 304. However, because the encoder 310 may output the first order codewords 303(1) before outputting the second order codewords 303(2), the TX queue 320 may be configured to store the first order codewords 303(1) without knowing the lengths of the second order codewords 303(2). In some implementations, the first order codewords 303(1) may be stored in a portion of the TX queue 320 reserved for first order codewords and the second order codewords 303(2) may be stored in a portion of the TX queue 320 reserved for second order codewords.

As shown in FIG. 3, the TX queue 320 may include a memory partition 322 reserved for the image tile 301. More specifically, the memory partition 322 includes a first codeword slot 322(1) reserved for the first order codewords 303(1) and a second codeword slot 322(2) reserved for the second order codewords 303(2). In some implementations, the first codeword slot 322(1) may have a fixed or predetermined size large enough to accommodate each of the first order codewords 303(1) having a maximum codeword length associated with the entropy coding scheme implemented by the entropy coding component 316, and the second codeword slot 322(2) may have a fixed or predetermined size large enough to accommodate each of the second order codewords 303(2) having the maximum codeword length. Thus, at least some of the available storage in the memory partition 322 may be left unused when one or more of the codewords 303(1) or 303(2) is shorter than the maximum codeword length.

The post-processor 330 is configured to retrieve the codewords 303(1) and 303(2) from the TX queue 320 and transmit the codewords 303(1) and 303(2), in the bitstream 304, to a decoder (such as the image decoder 220 of FIG. 2). In some implementations, the post-processor 330 may transmit the second order codewords 303 (2) before transmitting the first order codewords 303 (1). More specifically, the post-processor 330 may transmit the first order codewords 303 (1) immediately after the second order codewords 303 (2) so that the codewords 303 (1) and 303 (2) are contiguous in the bitstream 304. In other words, the post-processor 330 may retrieve only the second order codewords 303(2) and the first order codewords 303(1) from the codeword slots 322(2) and 322(1), respectively, so that no gaps are present in the bitstream 304.

By allowing the encoder 310 to output the first order codewords 303(1) before outputting the second order codewords 303(2), aspects of the present disclosure may improve the efficiency of resource usage by the encoder 310. Compared with existing image encoders that implement entropy coding techniques, the encoder 310 may remove the first order coefficients 302(1) and the first order codewords 303(1) from its internal registers (such as a graphics processing unit (GPU) memory or central processing unit (CPU) cache) sooner, without waiting until the lengths of the second order codewords 303(2) are known. As a result, the encoder 310 may improve the throughput of encoding operations, for example, by processing a greater number of images or image tiles in parallel.

Figure 4:
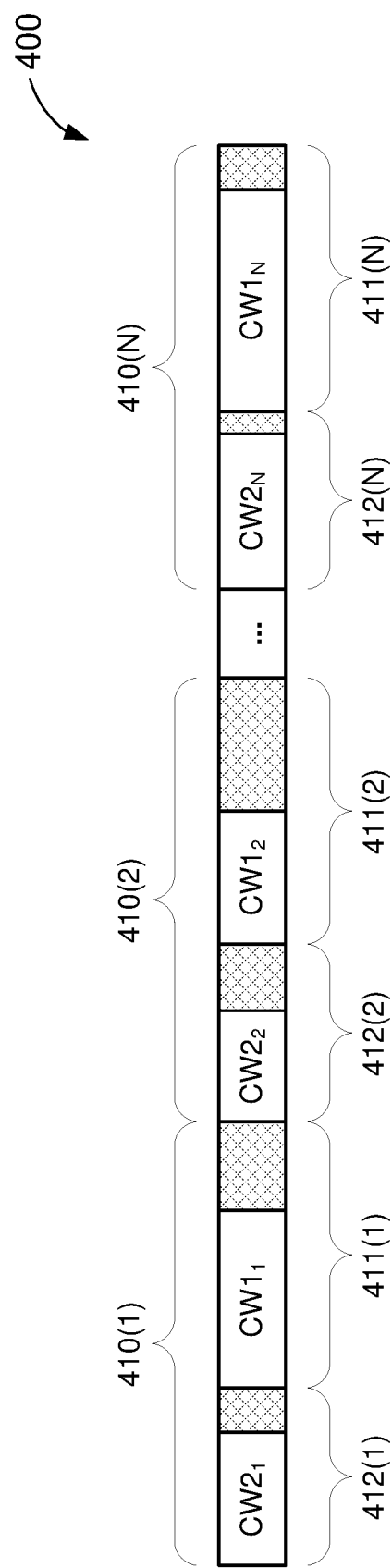
FIG. 4 shows an example transmit queue that supports dynamic queuing of entropy-coded data.

FIG. 4 shows an example transmit queue 400 that supports dynamic queuing of entropy-coded data. In some implementations, the transmit queue 400 may be one example of the TX queue 320 of FIG. 3. The transmit queue 400 is shown to include a number (N) of memory partitions 410(1)-410(N) each configured to store codewords associated with a respective image tile. With reference for example to FIG. 3, each of the memory partitions 410(1)-410(N) may be one example of the memory partition 322.

In some aspects, each of the memory partitions 410(1)-410(N) may include a respective first codeword slot reserved for first order codewords and a respective second codeword slot reserved for second order codewords. For example, the first memory partition 410(1) includes a first codeword slot 411(1) reserved for first order codewords associated with a first image tile and a second codeword slot 412(1) reserved for second order codewords associated with the first image tile; the second memory partition 410(2) includes a first codeword slot 411(2) reserved for first order codewords associated with a second image tile and a second codeword slot 412(2) reserved for second order codewords associated with the second image tile; and the $N^{th}$ memory partition 410(N) includes a first codeword slot 411(N) reserved for first order codewords associated with an $N^{th}$ image tile and a second codeword slot 412(N) reserved for second order codewords associated with the $N^{th}$ image tile.

As shown in FIG. 4, the transmit queue 400 stores N first order codewords $CW1_1$-$CW1_N$ in the first codeword slots 411(1)-411(N), respectively, and further stores N second order codewords $CW2_1$-$CW2_N$ in the second codeword slots 412(1)-412(N), respectively. More specifically, the codewords $CW1_1$ and $CW2_1$ stored in the first memory partition

410(1) represent the first image tile; the codewords $CW1_2$ and $CW2_2$ stored in the second memory partition 410(2) represent the second image tile; and the codewords $CW1_N$ and $CW2_N$ represent the $N^{th}$ image tile. In the example of FIG. 4, each of the first order codewords $CW1_1$-$CW1_N$ occupies only a portion of the available storage in a respective first codeword slot and each of the second order codewords $CW2_1$-$CW2_N$ occupies only a portion of the available storage in a respective second codeword slot.

In some aspects, the transmit queue 400 may store each of the first order codewords associated with a given image tile before storing the second order codewords associated with the same image tile. For example, the first memory partition 410(1) may store the first order codewords $CW1_1$ in the first codeword slot 411(1) before storing the second order codewords $CW2_1$ in the second codeword slot 412(1); the second memory partition 410(2) may store the first order codewords $CW1_2$ in the first codeword slot 411(2) before storing the second order codewords $CW2_2$ in the second codeword slot 412(2); and the Nth memory partition 410(N) may store the first order codewords $CW1_N$ in the first codeword slot 411(N) before storing the second order codewords $CW2_N$ in the second codeword slot 412(N).

Figure 5:
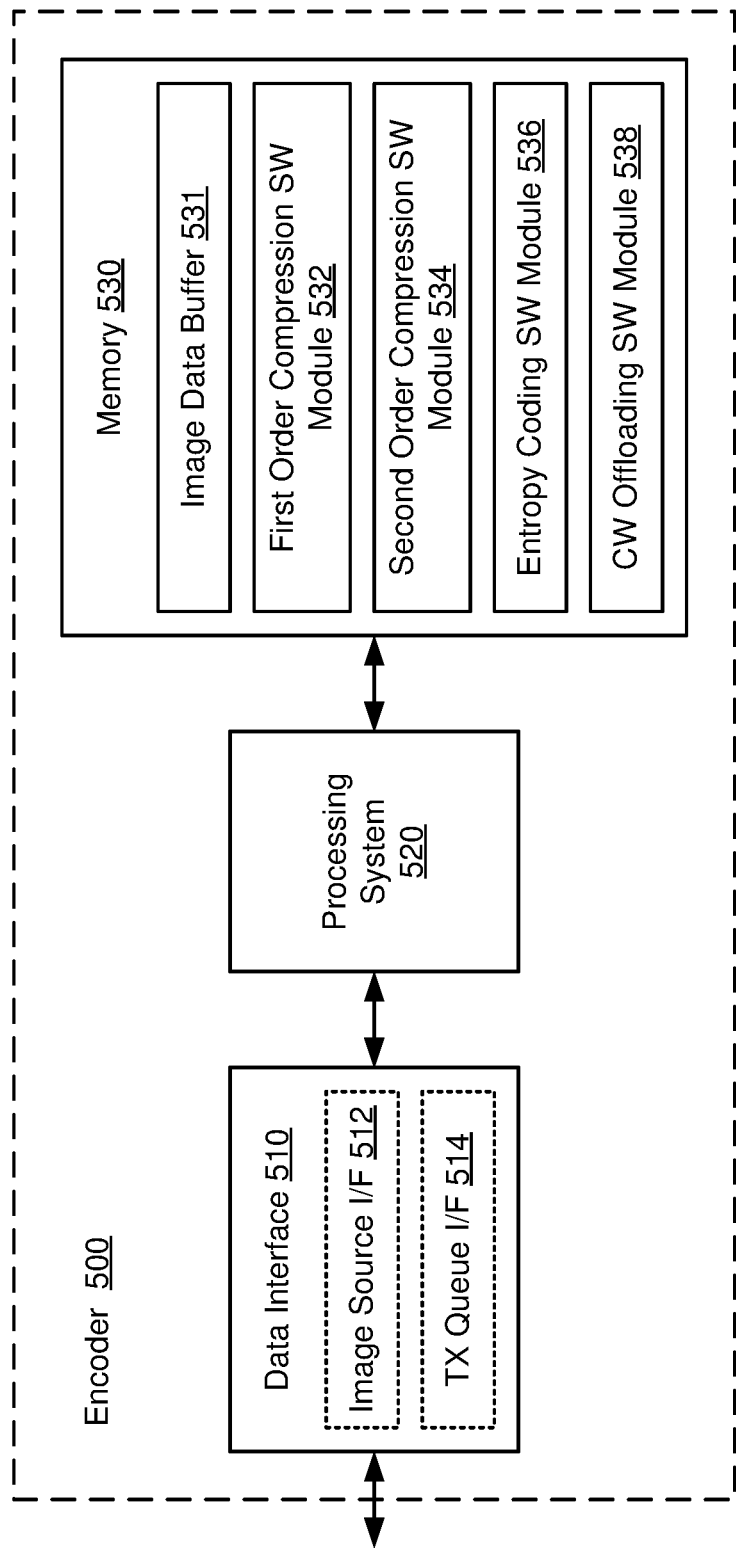
FIG. 5 shows a block diagram of an example encoder, according to some implementations.

FIG. 5 shows a block diagram of an encoder 500, according to some implementations. The encoder 500 may be one example of the data compression component 214 of FIG. 2 or the encoder 310 of FIG. 3. More specifically, the encoder 500 may be configured to compress pixel data representing a digital image as a set of codewords that can be transmitted, as a bitstream, to a decoder (not shown for simplicity).

In some implementations, the encoder 500 may include a data interface 510, a processing system 520, and a memory 530. The data interface 510 is configured to receive the pixel data to be encoded and to output the resulting codewords. In some aspects, the data interface 510 may include an image source interface (I/F) 512 configured to communicate with an image source and a transmit (TX) queue interface 514 configured to communicate with a TX queue. For example, the TX queue may store data to be transmitted in the bitstream. In some implementations, the image source interface 512 may receive the pixel data from the image source. In some implementations, the TX queue interface 514 may output the resulting codewords to the TX queue.

The memory 530 may include an image data buffer 532 that is configured to store the pixel data and any intermediate data associated with various image compression or encoding operations. The memory 530 also may include a non-transitory computer-readable medium (including one or more nonvolatile memory elements, such as EPROM, EEPROM, Flash memory, a hard drive, and the like) that may store at least the following software (SW) modules:

- a first order compression SW module 532 to perform a first order image compression operation that produces a plurality of first coefficients based on the pixel data;
- a second order compression SW module 534 to performing a second order image compression operation that produces one or more second coefficients based on the plurality of first coefficients;
- an entropy coding SW module 536 to encode the plurality of first coefficients as a plurality of first codewords, respectively, in accordance with an entropy coding scheme and to further encode the one or more second coefficients as one or more second codewords, respectively, in accordance with the entropy coding scheme; and
- a codeword (CW) offloading SW module 538 to output the plurality of first codewords, followed by the one or more second codewords, to the transmit queue.

Each software module includes instructions that, when executed by the processing system 520, causes the encoder 500 to perform the corresponding functions.

The processing system 520 may include any suitable one or more processors capable of executing scripts or instructions of one or more software programs stored in the encoder 500 (such as in memory 530). For example, the processing system 520 may execute the first order compression SW module 532 to perform a first order image compression operation that produces a plurality of first coefficients based on the pixel data. The processing system 520 also may execute the second order compression SW module 534 to performing a second order image compression operation that produces one or more second coefficients based on the plurality of first coefficients.

The processing system 520 may execute the entropy coding SW module 536 to encode the plurality of first coefficients as a plurality of first codewords, respectively, in accordance with an entropy coding scheme and to further encode the one or more second coefficients as one or more second codewords, respectively, in accordance with the entropy coding scheme. Further, the processing system 520 may execute the CW offloading SW module 538 to output the plurality of first codewords, followed by the one or more second codewords, to the transmit queue.

Figure 6:
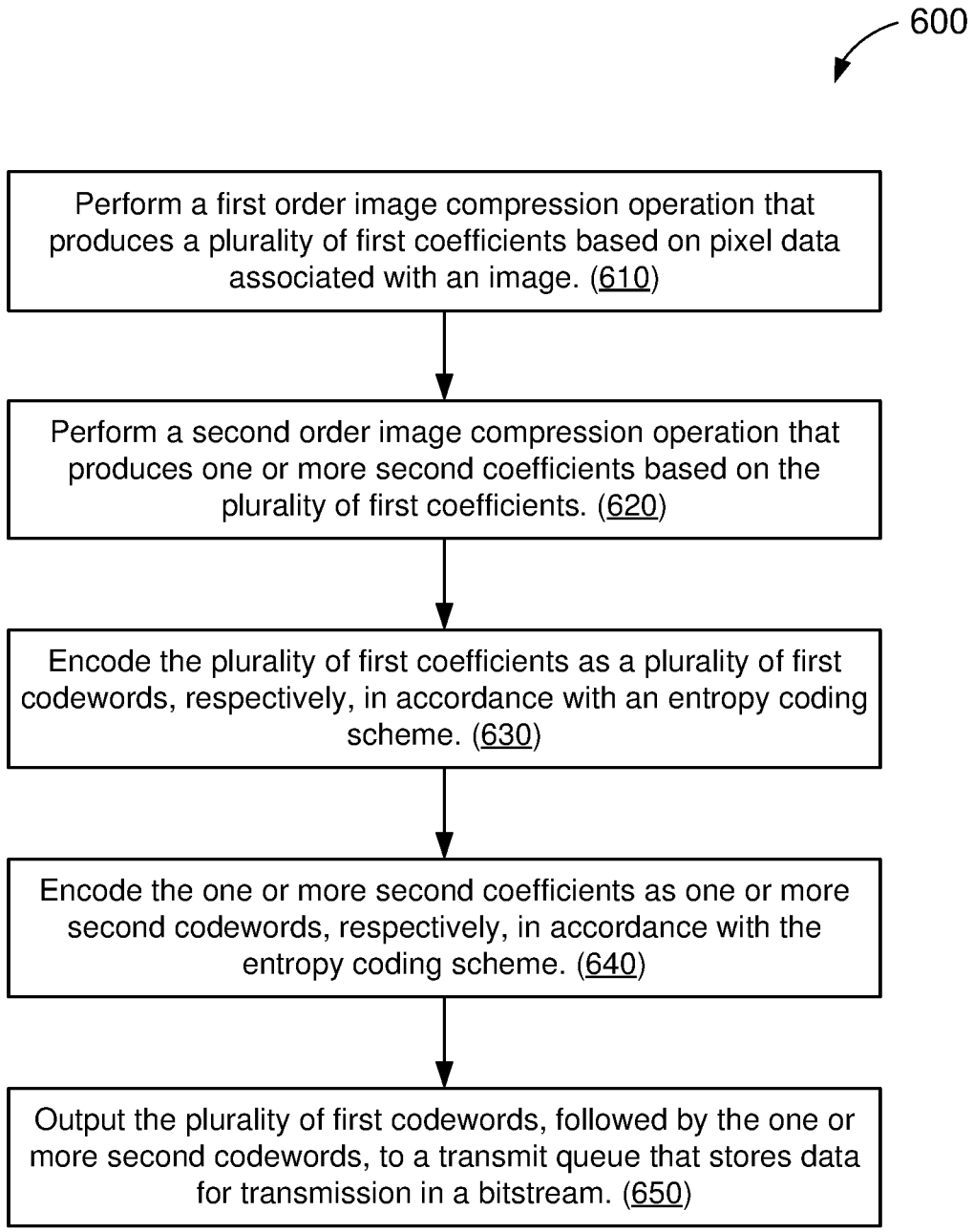
FIG. 6 shows an illustrative flowchart depicting an example operation for data encoding, according to some implementations.

FIG. 6 shows an illustrative flowchart depicting an example operation 600 for data encoding, according to some implementations. In some implementations, the example operation 600 may be performed by an encoder such as the data compression component 214 of FIG. 2, the encoder 310 of FIG. 3, or the encoder 500 of FIG. 5.

The encoder may perform a first-order image compression operation that produces a plurality of first coefficients based on pixel data associated with an image (610). In some implementations, the image may be partitioned into a plurality of tiles and the pixel data may represent one of the plurality of tiles. The encoder also may perform a second order image compression operation that produces one or more second coefficients based on the plurality of first coefficients (620). Further, the encoder may encode the plurality of first coefficients as a plurality of first codewords, respectively, in accordance with an entropy coding scheme (630). The encoder also may encode the one or more second coefficients as one or more second codewords, respectively, in accordance with the entropy coding scheme (640).

Further, the encoder may output the plurality of first codewords, followed by the one or more second codewords, to a transmit queue that stores data for transmission in a bitstream (650). In some implementations, the encoder may perform the second order image compression operation after outputting the plurality of first codewords to the transmit queue. In some aspects, the plurality of first codewords may be output to a first portion of the transmit queue reserved for the plurality of first codewords. In some implementations, the first portion of the transmit queue may have a fixed size configured to accommodate each of the plurality of first codewords having a maximum codeword length associated with the entropy coding scheme.

In some aspects, the encoder may further output the one or more second codewords to a second portion of the transmit queue reserved for the one or more second codewords, where the second portion of the transmit queue is separate from the first portion. In some implementations, the second portion of the transmit queue may have a fixed size configured to accommodate each of the one or more second codewords having a maximum codeword length associated with the entropy coding scheme. In some implementations, the data stored in the first portion of the transmit queue may be transmitted later in the bitstream than the data stored in the second portion of the data queue.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of data encoding, comprising:
    performing, by a first encoder, a first order image compression operation that produces a plurality of first coefficients based on pixel data associated with an image;
    performing, by the first encoder, a second order image compression operation that produces one or more second coefficients based on the plurality of first coefficients;
    encoding the plurality of first coefficients as a plurality of first codewords, respectively, in accordance with an entropy coding scheme;
    encoding the one or more second coefficients as one or more second codewords, respectively, in accordance with the entropy coding scheme; and
    outputting the plurality of first codewords, followed by the one or more second codewords, to a first portion and a second portion of a transmit queue, respectively, that stores data for transmission in a bitstream, the data stored in the first portion of the transmit queue being transmitted later in the bitstream than the data stored in the second portion of the transmit queue.

2. The method of claim 1, wherein the first portion of the transmit queue is reserved for the plurality of first codewords.

3. The method of claim 2, wherein the first portion of the transmit queue has a fixed size configured to accommodate each of the plurality of first codewords having a maximum codeword length associated with the entropy coding scheme.

4. The method of claim 2, wherein the second portion of the transmit queue is reserved for the one or more second codewords, and the second portion of the transmit queue is separate from the first portion.

5. The method of claim 4, wherein the second portion of the transmit queue has a fixed size configured to accommodate each of the one or more second codewords having a maximum codeword length associated with the entropy coding scheme.

6. The method of claim 1, wherein the second order image compression operation is performed after outputting the plurality of first codewords to the transmit queue.

7. The method of claim 1, wherein the image is partitioned into a plurality of tiles and the pixel data represents one of the plurality of tiles.

8. An encoder comprising:
    a processing system; and
    a memory storing instructions that, when executed by the processing system, causes the encoder to:
        perform a first order image compression operation that produces a plurality of first coefficients based on pixel data associated with an image;
        perform a second order image compression operation that produces one or more second coefficients based on the plurality of first coefficients;
        encode the plurality of first coefficients as a plurality of first codewords, respectively, in accordance with an entropy coding scheme;
        encode the one or more second coefficients as one or more second codewords, respectively, in accordance with the entropy coding scheme; and
        output the plurality of first codewords, followed by the one or more second codewords, to a first portion and a second portion of a transmit queue, respectively, that stores data for transmission in a bitstream, the data stored in the first portion of the transmit queue being transmitted later in the bitstream than the data stored in the second portion of the transmit queue.

9. The encoder of claim 8, wherein the first portion of the transmit queue is reserved for the plurality of first codewords.

10. The encoder of claim 9, wherein the first portion of the transmit queue has a fixed size configured to accommodate each of the plurality of first codewords having a maximum codeword length associated with the entropy coding scheme.

11. The encoder of claim 9, wherein the second portion of the transmit queue is reserved for the one or more second codewords, and the second portion of the transmit queue is separate from the first portion.

12. The encoder of claim 11, wherein the second portion of the transmit queue has a fixed size configured to accommodate each of the one or more second codewords having a maximum codeword length associated with the entropy coding scheme.

13. The encoder of claim 8, wherein the second order image compression operation is performed after outputting the plurality of first codewords to the transmit queue.

14. A system comprising:
a transmit queue configured to store data for transmission in a bitstream;
an encoder configured to:
perform a first order image compression operation that produces a plurality of first coefficients based on pixel data associated with an image;
perform a second order image compression operation that produces one or more second coefficients based on the plurality of first coefficients;
encode the plurality of first coefficients as a plurality of first codewords, respectively, in accordance with an entropy coding scheme;
encode the one or more second coefficients as one or more second codewords, respectively, in accordance with the entropy coding scheme; and
output the plurality of first codewords, followed by the one or more second codewords, to a first portion and a second portion of the transmit queue, respectively; and a post-processor configured to transmit the plurality of first codewords and the one or more second codewords from the transmit queue to a decoder, the data stored in the first portion of the transmit queue being transmitted later in the bitstream than the data stored in the second portion of the transmit queue.

15. The system of claim 14, wherein the first portion of the transmit queue is reserved for the plurality of first codewords and the second portion of the transmit queue is reserved for the one or more second codewords, the second portion of the transmit queue being separate from the first portion.

16. The system of claim 15, wherein the first portion of the transmit queue has a fixed size configured to accommodate each of the plurality of first codewords having a maximum codeword length associated with the entropy coding scheme and the second portion of the transmit queue has a fixed size configured to accommodate each of the one or more second codewords having the maximum codeword length.

17. The system of claim 14, wherein the encoder is configured to perform the second order image compression operation after outputting the plurality of first codewords to the transmit queue.

* * * * *